J. L. BIRD.
STALK CUTTER.
APPLICATION FILED JAN. 13, 1911.
991,601.
Patented May 9, 1911.
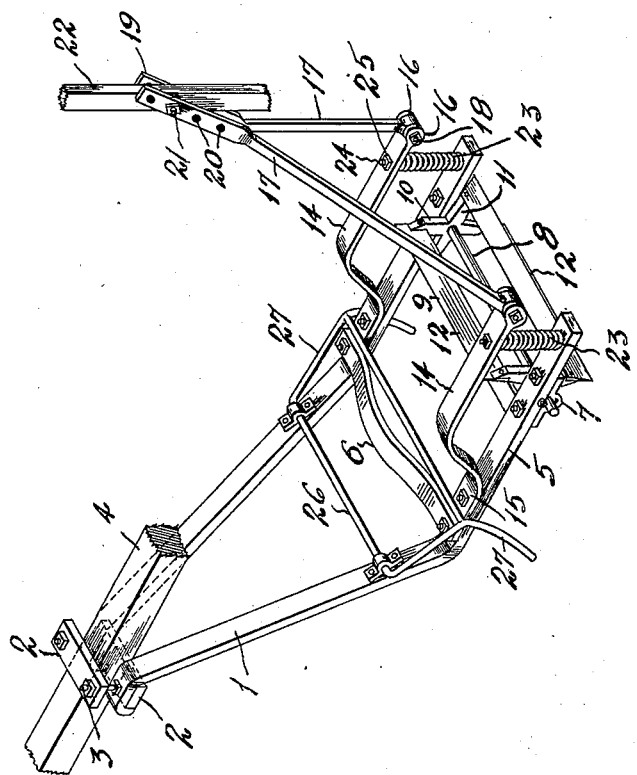
WITNESSES:
J. B. Bowling.
W. S. Castle.
INVENTOR
John L. Bird
BY
ATTORNEY

UNITED STATES PATENT OFFICE.

JOHN L. BIRD, OF LORAINE, TEXAS, ASSIGNOR OF ONE-HALF TO ST. ELMO BROWN, OF LORAINE, TEXAS.

STALK-CUTTER.

991,601. Specification of Letters Patent. Patented May 9, 1911.

Application filed January 13, 1911. Serial No. 602,373.

*To all whom it may concern:*

Be it known that I, JOHN L. BIRD, citizen of the United States, residing at Loraine, in the county of Mitchell and State of Texas, have invented certain new and useful Improvements in Stalk-Cutters, of which the following is a specification.

This invention pertains to stalk cutters.

The object of the invention is to provide a stalk cutter adapted to be attached to an ordinary cultivator or riding buster and employing a revolving cutter drum resiliently supported whereby the said cutter drum will yield upward upon encountering an obstruction and save the cutters from injury.

Finally the object of the invention is to provide means of the character described that will be strong, durable, efficient, and easy of operation, simple and comparatively inexpensive to construct, and also in which the several parts will not be likely to get out of working order.

With the above and other objects in view the invention has relation to certain novel features of construction and operation, an example of which is described in the following specification and illustrated in the accompanying drawing.

In the drawing I have shown a perspective view of the stalk cutter and have designated the various parts by numerals hereinafter explained.

The numeral 1 designates a pair of upwardly inclined side members converging toward their upper ends where a pair of transverse bars 2 and vertical bolts 3 are employed to connect the bars and secure them to the tongue 4 of the agricultural machine. The members 1 are integral with and extend from the forward ends of flat horizontal side bars 5. At the intersection of the side bars and the members 1 a transverse arch 6 is secured.

A short distance from the rear ends of the side bars, bearing boxes 7 are secured to the under sides of said bars. In these boxes the axle 8 of a drum 9 is supported. This drum is disposed between the side bars and has heads 10 adjacent said bars. Each head has radial arms 11 to the sides of which cutting blades 12 are secured so that a portion of each blade projects beyond the outer ends of the arms. It is to be understood that other forms of drums may be employed.

One of the particular features of the invention is a resilient or yieldable hanger whereby the drum is supported to yield upwardly when encountering stones, stumps and other obstructions. The hanger comprises a pair of spring arms 14 bent at substantially right angles at their forward ends where they are provided with forwardly directed lugs 15 secured on the side bars. The greater portion of each arm extends above and over the adjacent side bar and normally substantially parallel thereto. These arms are preferably of spring metal and have their free ends terminating over the rear ends of the side bars. Each arm at its free end has a pair of spaced ears 16 between which the lower end of a link 17 is pivoted on a transverse bolt 18 passing through the ears.

The links 17 extend upward and have each a flattened portion 19 at its upper end provided with a plurality of bolt holes 20. The holes of each portion 19 are alined and adapted to receive a transverse bolt 21. The portions 19 are engaged on opposite sides of the standard or mast 22 of a riding buster or other agricultural machine (not shown). By provision of the holes 20 the links may be adjusted whereby the drum will be properly supported or hung in cutting position.

While the arms 14 are more or less resilient it is desirable to mount between each side bar and each arm, a coil spring 23. For maintaining the springs in vertical position and limiting the spreading of each arm and its adjacent bar, vertical bolts 24 are passed through the springs and the bars and arms. These bolts are held in position by nuts 25.

It is obvious that the links form rigid connections and will not yield upward, but the spring arms 14 and springs 23 will yield upward and permit the side bars and drum to swing upward when an obstruction which would injure the cutting blades is encountered. This arrangement preserves the cutting edges of the blades and prolongs the life of the same.

On the members 1 a yoke 26 is secured. This yoke has a drag-hook 27 at each end which extends rearwardly and is curved downwardly on the outer side of the adjacent side bar. The hooks projecting below the side bars will operate to gather stalks and similar material and throw the same into the path of the cutting drum, whereby the stalks and like material would be operated upon.

What I claim, is:

1. In a stalk cutter, a frame, a tongue engaging device at the forward end of the frame, a cutting-drum journaled at the rear end of the frame, a pair of bent spring arms each secured at one end on the frame, a pair of links each having connection with the free end of one of the arms, the links being directed upward and adapted to be attached to an agricultural machine, and spring members interposed between the arms and the frame.

2. In a stalk cutter, a frame, a tongue engaging device at the forward end of the frame, a cutting-drum journaled at the rear end of the frame, a pair of bent spring arms each secured at one end on the frame, a pair of links each having connection with the free end of one of the arms, the links being directed upward and adapted to be attached to an agricultural machine, spring members interposed between the arms and the frame, a pair of connected drag-hooks mounted on the frame and terminating below the same, and an arch bar extending transversely of the frame in advance of the drum and adjacent the hook.

3. In a stalk cutter, a pair of side bars, a cutting-drum journaled near the rear end of the side bars, upwardly inclined members extending from the forward ends of the side bars, a tongue engaging device attached to the upper forward ends of the members, a transverse arch bar secured adjacent the intersection of the side bars and members, a pair of connected drag-hooks secured to the members and projecting below the side bars, spring arms, one secured to each side bar and extending over and above the same, coil springs, one confined between each spring arm and its adjacent side bar, a pair of links, each link having its lower end pivotally connected to one of the spring arms and provided with a flattened portion at its upper end having a plurality of holes, and a bolt engaging in the holes of the flattened portions of the links.

In testimony whereof I have signed my name to this specification in the presence of two subscribing witnesses.

JOHN L. BIRD.

Witnesses:
B. D. SMITH,
A. T. DONELSON.

---

Copies of this patent may be obtained for five cents each, by addressing the "Commissioner of Patents, Washington, D. C."